No. 641,416. Patented Jan. 16, 1900.
A. STROUD.
PULLEY.
(Application filed May 15, 1899.)
(No Model.)

Witnesses:-
William Crossley.
Peter Hughes.

Inventor:-
Arnold Stroud
per Hughes & Young
Attorneys.

UNITED STATES PATENT OFFICE.

ARNOLD STROUD, OF LONDON, ENGLAND.

PULLEY.

SPECIFICATION forming part of Letters Patent No. 641,416, dated January 16, 1900.

Application filed May 15, 1899. Serial No. 716,885. (No model.)

*To all whom it may concern:*

Be it known that I, ARNOLD STROUD, a subject of the Queen of Great Britain and Ireland, residing at Winterford View, Cranleigh, Guildford, London, in the county of Surrey, England, have invented new and useful Improvements in Driving and other Pulleys, (for which I have applied for a patent in Great Britain, No. 5,538, bearing date 14th of March, 1899,) of which the following is a specification.

My invention relates to improvements in driving and other pulleys; and the object is to provide means whereby the diameter of a pulley can be altered, so as to take up any slackness of the driving or driven belt which may occur during use.

In carrying my invention into effect I proceed in or in about the following manner, making reference to the accompanying drawings, in which—

Figure 1:
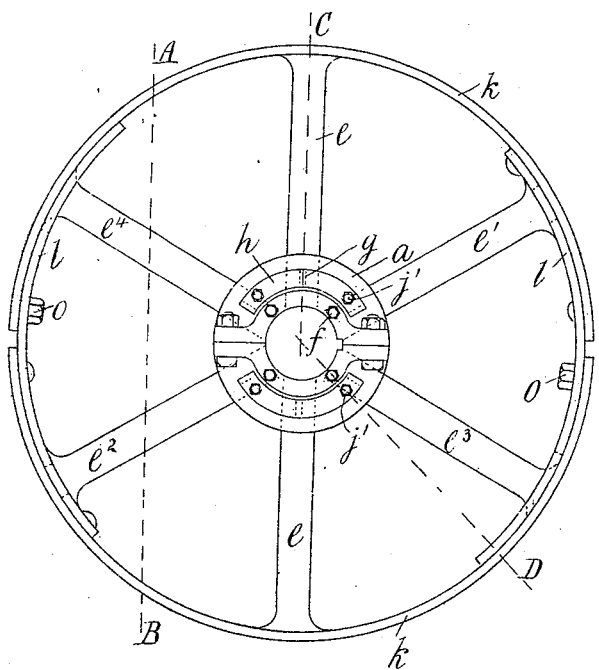
Figure 2:
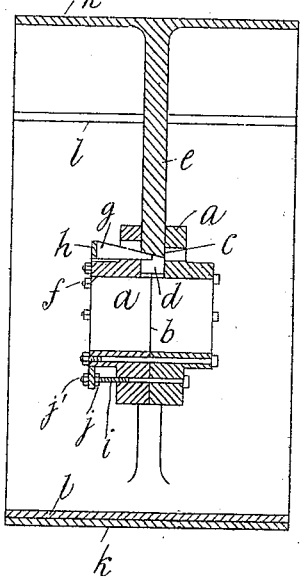
Figure 3:
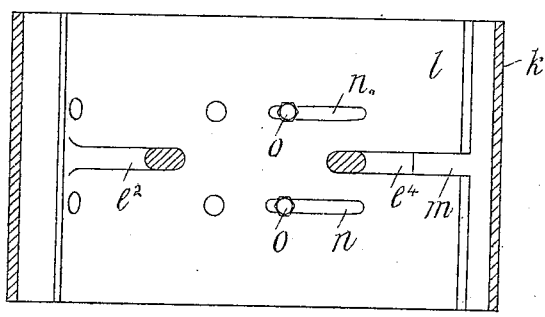

Figure 1 is a side view, Fig. 2 a section through line A B, Fig. 1 and Fig. 3 a section through line C D, Fig. 1, of a pulley made in accordance with my invention.

I provide a split or other boss $a$, which is split at right angles to the axis of the "eye," as at $b$. Each opposing face at $b$ is grooved so as to provide holes $c$, in which are free to move the inner ends $d$ of the spokes or arm $e$. The two longitudinal parts of the boss are fastened together by the bolts $f$. Slots are provided in the spokes $e$, and in these slots are fitted the wedges $g$. These wedges are arranged on a ring free to slide on the boss $a$, or in the case of a split boss they may be arranged on a segment, such as $h$, which can be held in position by studs $i$, passing freely through holes in the segment and into the boss $a$, inner and outer nuts $j$ and $j'$ being provided for localizing the segment in its required position on the studs $i$. The outer ends of the spokes are attached to segmental plates forming the rim of the pulley. There are preferably four of these segmental plates, two outer ones $k$ and two inner ones $l$. With this number of plates I prefer to use six spokes, all of which have their outer ends attached to the outer segmental plates $k$. Two of the spokes, $e'$ and $e^2$, are also attached to opposite ends of the inner plates $l$, through which they pass before meeting the outer plates $k$. At the opposite ends of the inner plates $l$ to those through which pass the spokes $e'$ and $e^2$ are open slots $m$, and the spokes $e^3$ and $e^4$ are free to slide in these slots. The inner plates $l$ are also slotted near the center, as at $n$, and headed pins $o$ pass through these slots into the plates $k$. When it is required to increase the diameter of the pulley, the bolts $f$ are slackened and the segments $h$ moved in, thus causing the wedges to act in the slots at the ends of the spokes and so lengthen the spokes and increase the diameter, the segmental plates $k$ and $l$ sliding over one another and accommodating themselves to the increased diameter. The bolts $f$ are then again tightened up.

What I claim as my invention, and desire to secure by Letters Patent, is—

An expansible pulley comprising a rim formed of plates adapted to slide over one another, spokes or arms secured to the outer plates of the rim and certain of said spokes or arms also secured to the inner plates and all the spokes passing through slots in said inner plates, the spokes having their inner ends slotted, a sectional pulley, hub or boss loosely receiving the slotted ends of the spokes or arms, wedges carried by the boss and adapted to enter the slots in the spokes and adjust said spokes and the rim-plates, and means for securing the sections of the hub and the wedges in position, substantially as set forth.

ARNOLD STROUD.

Witnesses:
DAVID MANN,
ARTHUR PARSONS.